Figure 1:
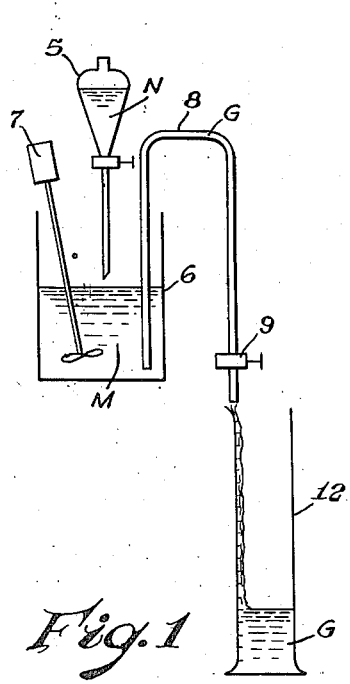

INVENTORS.
William C. Taylor
Lu Ho Tung
BY
Griswold & Burdick
ATTORNEYS

United States Patent Office 2,825,698
Patented Mar. 4, 1958

2,825,698
METHOD FOR THE PREPARATION OF DENSITY GRADIENTS

William C. Taylor and Lu Ho Tung, Midland, Mich., assignors to The Dow Chemical Company, Midland, Mich., a corporation of Delaware Application December 27, 1955, Serial No. 555,635

11 Claims. (Cl. 252—408)

This invention relates to an improved method for the preparation of liquid columns which have a gradient density from their lower to upper portions.

Liquid columns having a gradient density are useful analytical implements which may be employed advantageously for the quick and convenient determination of the densities or specific gravities of various materials. Such columns, which are frequently known as density gradients, indicate the density or specific gravity of materials which are immersed in the column due to their floating in suspension, with equilibrium buoyancy, at a position in the column at which the specific gravity or density of the liquid in the column and that of the immersed material are in correspondence. The application of density gradients for such purposes has been somewhat limited, however, because of the difficulty which has been encountered in satisfactorily preparing them. It has been conventional practice in the preparation of density gradients, for example, to place two or more liquid layers having differing densities or specific gravities in a column and to permit a gradient density to occur in the column by the action of diffusion forces in the liquids. Even when the diffusion between the liquid layers is accelerated by interfacial stirring or other disturbance, the conventional practice requires tedious and painstaking procedures to be undertaken in the preparation of density gradients. In addition, it is an arduous and uncertain task pursuant to conventional practice to prepare such liquid columns to have a uniformly gradient density.

It is among the principal objects of the present invention to provide an improved method for the ready and convenient preparatiton of more accurate density gradients having a substantially uniform rate of density change with height in the liquid column. The method of the present invention permits a greater practical adaptation of density gradients in analytical procedures and in other applications by obviating many of the difficulties and inconveniences attendant their conventional preparation. Additional objects and advantages are also apparent throughout the specification and description.

According to the present invention, a density gradient comprised of a uniformly varying mixture of two miscible and compatible liquids having different densities can be prepared readily and in an expeditious manner by continuously changing the relative proportions of the liquids in a mixture to constantly change the density of the mixture while transferring, without turbulence, a stream of the constantly changing density mixture of the liquids to a columnar container. This may be conveniently accomplished by continuously incorporating, at a uniform rate, a first liquid having a given density in a mixture maintained at a substantially constant volume with a second liquid which is miscible and compatible with, and has a density different than the first liquid so as to constantly change the density of the mixture; and continuously transferring, without turbulence, portions of the constantly changing density mixture to a columnar container at about the same uniform rate as that at which the first liquid is added to the mixture. Advantageously the constantly changing density mixture can be continuously agitated in an efficient manner which does not induce cavitation or bubbling in the mixture to insure a uniform incorporation of the first liquid in the mixture with the second.

Optionally, the column may be filled either from the top or bottom with the constant changing density mixture. It is necessary for the density gradient to be in the form of a liquid column having an upwardly decreasing gradient density. To this end, when the column is being filled from the bottom, it is beneficial to prepare the constantly changing density mixture by adding a heavier or greater density liquid to an initially major or total proportion of a lighter or lower density liquid in the mixture so that a less dense mixture of the liquids will ultimately constitute the upper portion of the density gradient. Conversely, when the column is filled from the top it is necessary to add a lighter liquid to initially major or total proportions of a heavier liquid in the mixture to insure the requisite downwardly increasing density of the density gradient column.

Density gradients prepared according to the method of the present invention have a substantially linear and uniform rate of change in their liquid density throughout the height of a uniformly cross-sectioned column. They may be employed as soon as desired after their preparation and do not require long and tedious preparation techniques. Neither is it necessary to wait for the occurrence of sufficient interfacial diffusion in order for a usable density gradient to be obtained. When handled carefully, the density gradients are useful for prolonged periods of time before they are changed to uniformly dense columns by diffusion of the mixed liquids. Frequently they may be employed satisfactorily for periods of months and even for a year or longer after their preparation. In addition, they permit the reliable and extremely accurate measurement of the specific gravities of various materials in a quick and efficient manner. In many instances, for example, density gradients can be prepared with which accurate measurements to units as close as ten-thousandths of a gram per cubic centimeter can be obtained. As is obvious, they can also be employed to obtain a lesser accuracy if such use is satisfactory for the purposes which may be at hand.

Further illustration of the method of the present invention is afforded in the accompanying drawing wherein;

Figure 1 represents an assembly of apparatus for preparing density gradients pursuant to the method of the present invention.

Figure 2:
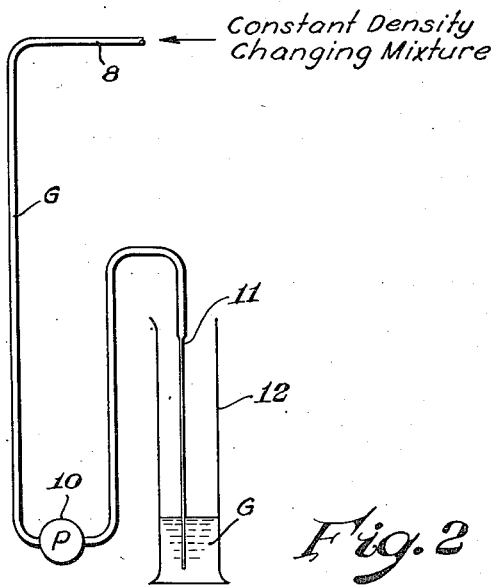
Figure 4:
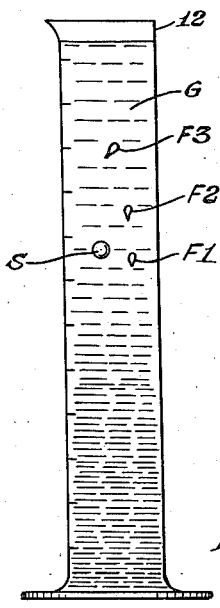
Figure 3:
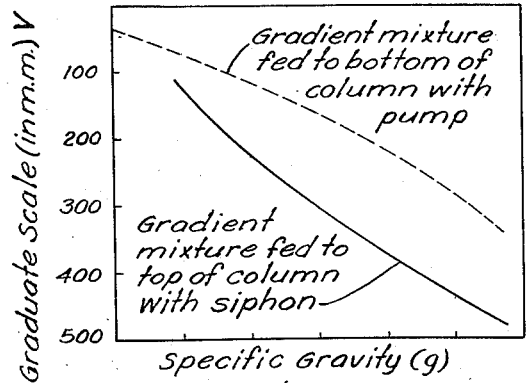

Figure 2 schematically represents an alternative procedure;

Figure 3 is a graph depicting typical characteristics of density gradients prepared according to the invention; and Figure 4 illustrates the employment of a calibrated density gradient.

An embodiment of the method of the present invention is illustrated in Figure 1. A fixed volume ($V_0$) of a higher density liquid or liquid solution M, having a given initial density ($g_0$), is contained in a suitable container such as a beaker 6. A volume of a lower density liquid or liquid solution N, having a density ($g_1$), contained in a separatory funnel 5 (or like container) dischargeable at a constant rate of flow ($U_1$) to the beaker 6, wherein it is mixed with the quantity of liquid M in the beaker by an efficient stirring means such as a mixer 7 which agitates the liquids vigorously in order to thoroughly mix them without inducing cavitation or bubbling. The density of the mixture of the liquids M and N in the beaker 6 is constantly uniformly changed by the addition and mixing of the liquid N. The liquid mixture in the beaker is maintained substantially at a constant volume ($V_0$) by means of its continuous withdrawal, as a constantly changing mixture G, having a constantly changing density ($g$) through a siphon tube 8 at a uniform rate of volume flow ($U_2$) which is at about the same rate of flow as that of the liquid N being added to the beaker 6. A stopcock 9 in the siphon tube 8 is used to regulate and correlate the flow rate of the constantly changing density liquid mixture G which is discharged from the siphon tube to form a density gradient column in the graduated cylinder 12. Since the lighter liquid N is being added to the heavier liquid M to prepare the constantly density changing liquid mixture G, the column forming the density gradient in the cylinder 12 is filled from the top to insure the upwardly decreasing density of the liquid mixture proportional to the changing volume (V) of the column. Care should be taken when top filling a density gradient column to direct the stream from the siphon tube against the side of the container holding the column to minimize turbulence within the column.

In an alternative procedure, as depicted in Figure 2, a constant delivery pump 10, which advantageously may be a constant delivery pump, such as a metering type gear pump, may be employed to transfer the constantly density changing liquid mixture G and form the density gradient column by bottom filling the density gradient column in the graduated cylinder 12. A metering orifice 11 may be used instead of a stopcock to control the rate of flow ($U_2$) of the constant density changing mixture G. The liquid mixture G may be prepared in any suitable manner (not illustrated in Figure 2) which may conveniently be similar to that explained in connection with Figure 1. Since the density gradient column is being bottom filled, the constantly density liquid mixture G in Figure 2 may advantageously be prepared by mixing a heavier liquid M having, in such case, a density ($G_1$), into a larger volume of a lighter liquid N, having an initial density ($g_0$), in an analogous but converse manner to that described in connection with the scheme depicted in Figure 1. After filling the graduated cylinder 12 with the density gradient column, the metering orifice 11 is carefully withdrawn with minimum disturbance of the liquid mixture in the column.

The various relationships existing in density gradient columns prepared according to the method of the present invention may be expressed in the following terms wherein $g$ is the density of the constantly density changing liquid mixture G, which is transferred to form the density gradient column at a uniform rate of flow $U_2$; $g_1$ is the relatively lower (or higher) density of the liquid N (or M) which is added at a uniform rate of flow $U_1$ to a larger volume of liquid M (or N) having a relatively higher (or lower) initial density $g_0$; V is the changing volume of the density gradient column during its preparation; $V_0$ is the substantially constant volume at which the constantly density changing liquid G is prepared by mixture of the starting liquids N with M, in either desired sequence; and $t$ is time:

$$\frac{dg}{dt} = \frac{g_1 U_1 - g U_2}{V_0} - \frac{g}{V_0}(U_1 - U_2) \quad (1)$$

$$\frac{dV}{dt} = U_2 \quad (2)$$

$$\frac{dV_0}{dt} = U_1 - U_2 \quad (3)$$

For the case when $U_1$ equals $U_2$ and when $g_1$ has a constant value and $g$ is equivalent to $g_0$ at zero time, the solution of Equations 1, 2 and 3 is as follows:

$$\frac{g - g_1}{g_0 - g_1} = e - \left(\frac{V}{V_0}\right) \quad (4)$$

As is apparent from analysis of the Equation 4, the relationship between $g$ and $V$ is not truly linear. Nevertheless, if $V_0$ is a relatively large quantity with respect to the final value of V, and is constant as in the case when $U_1$ equals $U_2$, a substantially linear relationship in the density gradient column between $g$ and $V$ may be obtained. When the total volume of the density gradient and $V_0$ are about the same, a sufficiently linear density gradient for most practical purposes is obtained.

This is further illustrated in the graphs depicted in Figure 3, wherein the substantially linear characteristics of a density gradient prepared by top filling a column from a siphon according to a method similar to that described in connection with Figure 1 is depicted by the curve in a solid line, and the characteristics of a gradient prepared by bottom filling a column with a pump pursuant to the procedure described in connection with Figure 2 is depicted by the curve in a broken line.

As is apparent from further consideration of the foregoing expressions, a density gradient having truly linear characteristics can be obtained by operating with different and dissimilar flow rates $U_1$ or $U_2$ or by adding a liquid having a varying density $g_1$ in the preparation of the constantly density changing mixture G. Thus, as an example, if the rate of flow $U_2$ is twice the rate of flow $U_1$ ($U_2 = 2U_1$) and $(V_0)_0$ represents the initial value of $V_0$ at zero time, the solution of Equations 1, 2 and 3 defines the linear relationship:

$$\frac{g - g_1}{g_0 - g_1} = 1 - \frac{U_1}{(V_0)_0} t \quad (5)$$

As a matter of actual practice, however, the regulation of the flow rates $U_1$ and $U_2$ at different and dissimilar values is a difficult matter to physically perform. Hence the preparation of truly linear density gradients is best reserved for those instances where their being available may be an absolute necessity.

Greater accuracy can be obtained in density gradients when the miscible liquids employed have relatively narrow differences in density and when relatively higher or taller columns having substantially uniform cross-sections are utilized for given density ranges which may be desirable in any particular density gradient. It is convenient, as is illustrated, for the density gradient columns to be contained in graduated cylinders and like containers and it is desirable for their volumes to be in the neighborhood of at least about 500 milliliters. This permits the density or specific gravity of the liquid mixture at various levels in the column to be correlated to the graduations or markings on the container and facilitates the "reading" of the density gradient, as it were, in order to determine the specific gravity of objects which are immersed in the column.

In this connection, density gradients may be calibrated conveniently by immersing "standard floats" or objects of known density or specific gravity in the column. This is illustrated in Figure 4. A graduated series of such objects F1, F2 and F3 are immersed in the constantly density changing liquid mixture G which forms the density gradient in the graduated cylinder 12. Besides providing an excellent means for identifying the value of the density gradient at various levels, the standard floats F1, F2 and F3 permit more accurate reading of the specific gravity of a sample S, shown in suspended immersion between the floats F1 and F2, by interpolation of its value based on consideration of its relative mean position between the known values of the density gradient at the equilibrium position assumed by the suspended floats. In addition, the use of standard floats such as F1, F2 and F3 prolong the useful life of the density gradient by constantly accommodating and indicating the gradual changes in the gradient density as they occur upon interlevel diffusion of the columnar liquid mixture.

The standard floats F1, F2 and F3 for calibrating and reading the density gradient may be any material, liquid or solid, which is immiscible with and unaffected by the mixed liquids in the column and has a known or accurately determinable density or specific gravity within the range of the density gradient. Hollow glass beads are particularly desirable in many cases for employment as standard floats, although other materials may be utilized such as plastic objects or even immiscible droplets of various liquids or solutions.

As is generally the case, the density gradients prepared according to the present invention perform best when employed at a temperature near the temperature at which they are calibrated. Temperature variations greater than about five centigrade degrees from the calibration temperature may cause inaccuracies in the use of a calibrated density gradient.

Any two miscible liquids that are compatible with one another and with the material whose density or specific gravity is to be measured may be employed for preparing density gradients according to the method of the present invention. As is apparent, the liquids must be selected on the basis of having appropriate separate densities for preparing density gradients within a usable or desirable range. Care should be exercised in the selection of the liquids to avoid those that tend to induce entrainment of gases and bubble formation. Many liquid mixtures have an undesirable propensity for such behavior. Merely by way of illustration, a liquid system comprised of isopropyl alcohol and diethylene glycol is especiall advantageous for preparing density gradients according to the method of the present invention for application with such polymeric materials as polyethylene.

By way of additional illustration, the specific gravities of several polyethylene samples were determined in density gradients prepared according to the method of the present invention with a gradient density mixture of isopropyl alcohol and diethylene glycol. A density gradient column, contained in a conventional 500 milliliter graduated cylinder was employed to cover a range from about 0.915 to 0.925 grams per cubic centimeter. The density gradient was calibrated and employed at a temperature which was maintained constantly with in about 0.01 centigrade degree of 23° C. The determinations of the densities obtained for each of the samples is compared in the following table with their known densities as obtained by an exact analytical procedure.

| Sample | Density by Density Gradient, grams/cc. | Known Density, grams/cc. |
| --- | --- | --- |
| A | 0.9173 | 0.9172-0.9173 |
| B | 0.9175 | 0.9175 |
| C | 0.9199 | 0.9194 |
| D | 0.9240 | 0.9241 |

In employing density gradients prepared according to the method of the present invention, it is beneficial to keep the column in covered containers to avoid evaporation losses which may affect the accuracy of its upper portions. In order to avoid the use of such upper portions and to circumvent the possibility of errors which may arise therefrom, it may frequently be prudent to prepare density gradients to have a sufficiently wide range which is permissive of such manner of employment. It is possible to minimize evaporation losses from the density gradient by covering the top of the column with a layer of the lighter liquid in the mixture. Readings are usually more accurate if the immersed samples are permitted at least about an hour to assume equilibrium positions. While samples can usually be removed from a column by touching them with a glass rod and slowly drawing them to the surface, it is probably more expedient in most instances to prepare a new density gradient than to remove a very large number of samples. Satisfactory density gradients can be ordinarily prepared with commonly available reagent grade materials which require no special preparation or purification for the purpose.

Since certain changes and modifications can be readily entered into in the practice of the present invention without departing substantially from its intended spirit and scope, it is to be fully understood that all of the foregoing description and specification be interpreted as being merely illustrative of certain of the more preferred embodiments of the invention and in no sense or manner is it to be construed or taken as being limiting or restrictive thereof, excepting as it is set forth and defined in the appended claims.

What is claimed is:

1. Method for preparing a density gradient consisting of a uniformly varying mixture of two miscible and compatible liquids having different densities which comprises continuously changing the relative proportions of the liquids in a mixture to constantly change the density of the mixture while transferring, without turbulence, a stream of the constantly changing density liquid mixture to a columnar container.

2. The method of claim 1 wherein the constant density changing liquid mixture is continuously transferred, without turbulence, to the container.

3. Method for preparing a density gradient consisting of a uniformly varying mixture of two miscible and compatible liquids having different densities which comprises continuously incorporating, at a uniform rate, a first liquid having a given density in a mixture maintained at a substantially constant volume with a second liquid which has a density different than the first liquid so as to constantly change the density of the mixture; and continuously transferring, without turbulence, portions of the constantly changing density mixture to fill a liquid density gradient column in a columnar container at about the same uniform rate as that at which the first liquid is added to the mixture.

4. The method of claim 3 wherein the first liquid has a relatively lower density than the second liquid and wherein the density gradient column in the container is filled, without turbulence, from the top.

5. The method of claim 3 wherein the first liquid has a relatively greater density than the second liquid, and wherein the density gradient column in the container is filled, without turbulence, from the bottom.

6. The method of claim 3 wherein the liquids are isopropyl alcohol and diethylene glycol.

7. Method for preparing a density gradient having substantially linear characteristics and consisting of two miscible and compatible liquids having different densities which comprises continuously incorporating, at a given uniform rate of volume flow, a first liquid having a density ($g_1$) in a mixture maintained at a substantially constant volume ($V_0$) with a second liquid which has a different initial density ($g_0$) than the first liquid so as to constantly change the density ($g$) of the mixture; and continuously transferring, without turbulence, portions of the constantly changing density mixture to fill a liquid density gradient column having a constantly changing volume ($V$) in a columnar container at about the same uniform rate as that at which the first liquid is added to the mixture wherein the characteristics of the density gradient may be expressed approximately by the formula:

$$\frac{g-g_1}{g_0-g_1} = e - \left(\frac{V}{V_0}\right)$$

8. The method of claim 7 wherein the liquids are isopropyl alcohol and diethylene glycol.

9. The method of claim 7 wherein the total volume of the density gradient filled in the columnar container is about equal to the substantially constant volume of the mixture which is maintained.

10. The method of claim 7 wherein the total volume of the density gradient filled in the columnar container is about equal to the substantially constant volume of the mixture and is in an amount of at least about 500 milliliters.

11. Method for preparing a density gradient having linear characteristics and consisting of two miscible and compatible liquids having different densities which comprises continuously incorporating, at a rate of volume flow ($U_1$), a first liquid having a constant density in a variable volume of a mixture with a second liquid which has a different initial density than the first liquid so as to constantly change the density ($g$) of the mixture; and continuously transferring, without turbulence, portions of the constantly changing density mixture to fill a liquid density gradient column having a constantly changing volume ($V$) in a uniformly-cross sectioned columnar container at a uniform rate of volume flow ($U_2$) which is different and dissimilar to the rate of flow ($U_1$) at which the first liquid is added to the mixture in such a manner that a linear relationship between ($g$) and ($V$) is obtained in the density gradient column.

References Cited in the file of this patent

UNITED STATES PATENTS

| | | |
|---|---|---|
| 1,159,889 | Benjamin | Nov. 9, 1915 |
| 1,550,412 | Albrecht et al. | Aug. 18, 1925 |
| 2,396,470 | Mortensen | Mar. 12, 1946 |

OTHER REFERENCES

Determination of the Specific Gravities of Minimal Amounts of Liquids etc., Exton—Transactions of American Urological Assn., vol. XII, 1920. Reprint by Laboratory of Prudential Insurance Company of America, Newark, New Jersey (93 pages) (pages 90 and 91 of printed matter and Plate II of drawing cited).